(12) United States Patent
Correa

(10) Patent No.: US 11,506,330 B2
(45) Date of Patent: Nov. 22, 2022

(54) ROTATABLE BASE STAND WITH ROTABLE POWERING SOURCE

(71) Applicant: David I. Correa, Boca Raton, FL (US)

(72) Inventor: David I. Correa, Boca Raton, FL (US)

(*) Notice: Subject to any disclaimer, the term of this patent is extended or adjusted under 35 U.S.C. 154(b) by 163 days.

(21) Appl. No.: 16/933,809

(22) Filed: Jul. 20, 2020

(65) Prior Publication Data

US 2022/0018493 A1 Jan. 20, 2022

(51) Int. Cl.
| | |
|---|---|
| *F16M 11/20* | (2006.01) |
| *F16M 13/00* | (2006.01) |
| *F16M 11/24* | (2006.01) |
| *H01R 39/64* | (2006.01) |
| *F16H 1/10* | (2006.01) |
| *A47G 33/12* | (2006.01) |

(52) U.S. Cl.
CPC ........... *F16M 11/2014* (2013.01); *F16H 1/10* (2013.01); *F16M 11/24* (2013.01); *F16M 13/00* (2013.01); *H01R 39/64* (2013.01); *A47G 33/126* (2013.01); *A47G 2033/122* (2013.01); *F16M 2200/08* (2013.01)

(58) Field of Classification Search
CPC .... F16M 11/2014; F16M 11/24; F16M 13/00; F16M 2200/08; A47G 33/126; A47G 2033/122; H01R 39/64
See application file for complete search history.

(56) References Cited

U.S. PATENT DOCUMENTS

| | | | | |
|---|---|---|---|---|
| 2,485,460 | A * | 10/1949 | Rocco | A47G 33/126 307/157 |
| 2,847,175 | A * | 8/1958 | Farley | A47F 5/025 108/150 |
| 3,017,150 | A * | 1/1962 | Kahle | A47G 33/126 211/1.51 |
| 3,042,350 | A * | 7/1962 | Lencioni | A47G 33/126 248/527 |
| 5,190,261 | A * | 3/1993 | Tetting | A47G 33/126 211/163 |
| 6,320,327 | B1 * | 11/2001 | Lavatelli | A47G 33/126 315/185 S |
| 6,739,566 | B1 * | 5/2004 | Kao | A47G 33/126 248/522 |
| 6,854,608 | B2 | 2/2005 | McNeeley et al. | |
| 8,276,871 | B1 | 10/2012 | DeRienzo | |
| 10,896,795 | B2 * | 1/2021 | McRae | A47G 33/08 |

* cited by examiner

*Primary Examiner* — Tan Le
(74) *Attorney, Agent, or Firm* — Mark C. Johnson; Johnson Dalal

(57) ABSTRACT

A rotatable base stand with a rotatable powering source that includes a lower base body, an electrical body plug for powering the rotatable base, an upper base body with a top surface defining an extension outlet port and with an extension electrical outlet coupled thereto, wherein the extension electrical outlet has outlet ports, is disposed within the extension outlet port, is oriented in a longitudinal direction, and is operably configured to electrically couple with the electrical body plug. The stand also includes an electrical extension plug electrically coupled to the extension electrical outlet and operably to provide power to objects supported by the base stand. The base stand also includes a bearing assembly and a motor that is operably coupled to the upper base body and operably configured to selectively rotate the upper base body 360° along a base rotation path with respect to the lower base body.

19 Claims, 9 Drawing Sheets

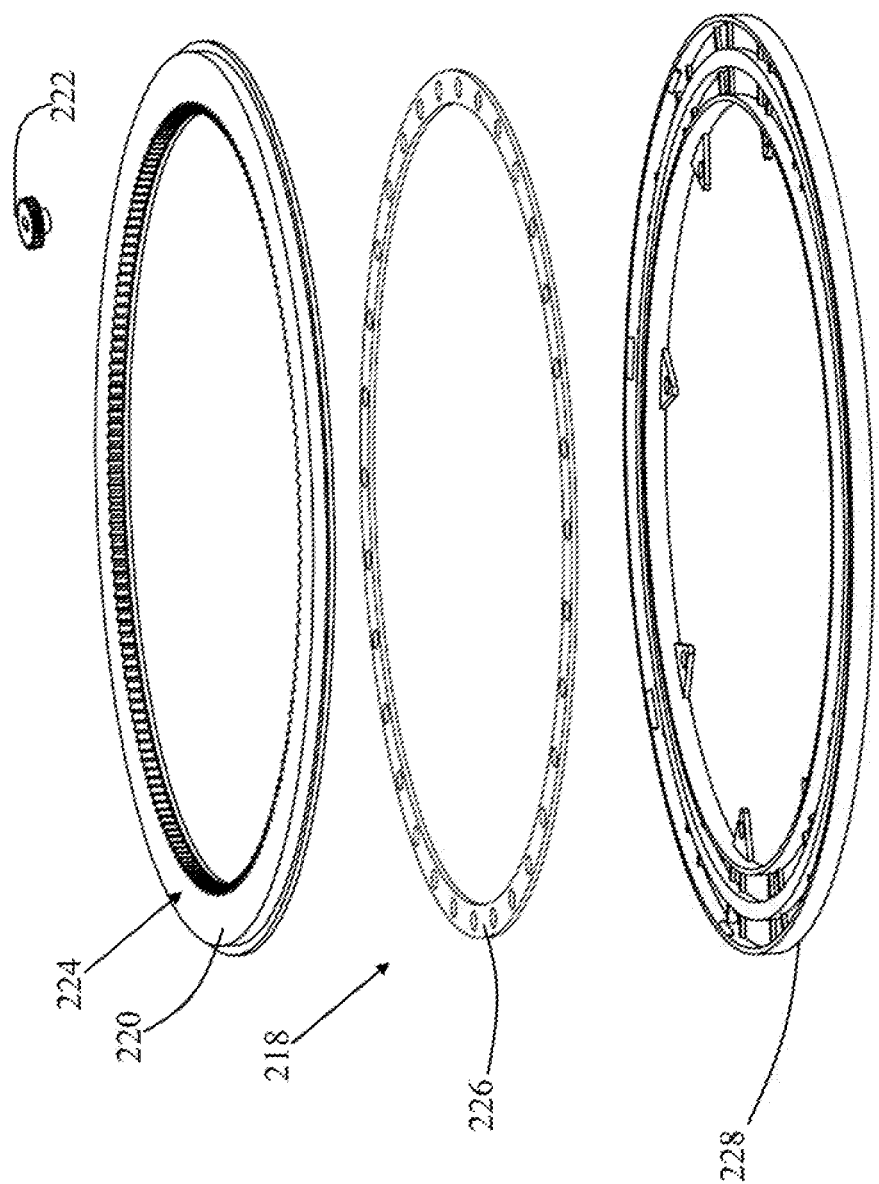

ROTATABLE BASE STAND WITH ROTABLE POWERING SOURCE

FIELD OF THE INVENTION

The present invention relates generally to rotating base stands, and, more particularly, relates to rotating stands having powering capabilities.

BACKGROUND OF THE INVENTION

Whether for aesthetic or functional reasons, many users desire to rotate objects on a carousel. In some instances, the object(s) rotated require electricity in order to function properly, or at all. Providing power to these object(s), however, can often be problematic, particularly for taller object(s), such as Christmas trees. For example, one known device, like the one embodied in DeRienzo, U.S. Pat. No. 8,276,871, enables rotation of the Christmas tree, but prevents the tree from being utilized with lighting (as the cord for any lighting would wrap around the tree when rotated). Those lighting options not utilizing a cord prevent longer usage of the lights, which many users find problematic.

Therefore, a need exists to overcome the problems with the prior art as discussed above.

SUMMARY OF THE INVENTION

The invention provides a rotatable base stand with rotatable powering source that overcomes the hereinafore-mentioned disadvantages of the heretofore-known devices and methods of this general type and that enables selective rotation of one or more objects in an effective, efficient, and safe manner. Additional embodiments of the invention include the rotatable base stand having a rotatable powering source operably configured to power the objects that may be selectively rotated.

With the foregoing and other objects in view, there is provided, in accordance with the invention, a rotatable base stand assembly with rotatable powering source having a lower base body with a lower wall, a sidewall surrounding the lower wall, and defining a body cavity. The assembly also includes an electrical body plug electrically coupled to a body electrical cord extending outwardly from the sidewall of the lower base body and an upper base body with a top surface, with a bottom surface opposing the top surface, defining an extension outlet port on the top surface of the upper base body, and with an extension electrical outlet coupled thereto. The extension electrical outlet includes outlet ports oriented in a longitudinal direction, disposed within the extension outlet port, and operably configured to electrically couple with the electrical body plug. The assembly also includes an electrical extension plug electrically coupled to an extension electrical cord extending outwardly from and electrically coupled to the extension electrical outlet. The assembly also includes a bearing assembly rotatably coupling the upper base body to the lower base body, wherein the bearing assembly is interposed between the lower base body and the upper base body. The assembly also includes a motor housed in the body cavity, and that is electrically coupled to the electrical body plug, and is operably coupled to the upper base body. The motor operably configured to selectively rotate the upper base body, with the extension electrical outlet, at least 180° along a base rotation path with respect to the lower base body.

In accordance with another feature of the present invention also includes the bearing assembly having a plurality of gears directly coupled together in a meshed configuration, wherein one of the plurality of gears directly coupled to the motor and another of the plurality of gears coupled to the upper base body.

In accordance with yet another feature, an embodiment of the present invention also includes the plurality of gears having a pinion gear directly coupled to the motor and an annular gear having a sidewall with an inner surface having a plurality of teeth disposed thereon and with pinion gear directly coupled thereto, wherein the annular gear with an upper surface including the bottom surface of the upper base body directly coupled thereto.

In accordance with an additional feature, an embodiment of the present invention also includes the bearing assembly having a lower track directly coupled to the lower base body and an annular gasket interposed between and directly coupled to the lower track and the annular gear.

In accordance with an additional feature, an embodiment of the present invention also includes the upper base body having a rotary electrical slip ring directly coupled to, and centrally disposed on, the upper base body, wherein the rotary electrical slip ring electrically coupled with the extension electrical outlet and the electrical body plug.

In accordance with yet another feature, an embodiment of the present invention also includes an electronic control unit housed in the body cavity and electrically coupled to the electrical extension plug and communicatively coupled to the electrical extension plug and/or motor and operably configured to emit an electronic signal to operate the motor and/or emit an electronic signal completing an electrical circuit on the electrical extension plug.

In accordance with another feature, an embodiment of the present invention also includes a remote control communicatively coupled to the electronic control unit and operably configured to cause the electronic control unit 704 to emit the at least one of the electronic signal to operate the motor and the completion of the electrical circuit on the electrical extension plug.

In accordance with exemplary feature, an embodiment of the present invention also includes either the electrical extension plug and/or the extension electrical cord having a coupling strap with a portion coupled and affixed to thereto, wherein the coupling strap operably configured selectively close forming an enclosed loop and an adjustable loop aperture and selectively open to provide access to the adjustable loop aperture with two ends of the coupling strap.

In accordance with an additional feature, an embodiment of the present invention also includes the upper base body having a perimeter edge surrounding the top surface of the upper base body, wherein the outlet port disposed proximal to the perimeter edge.

In accordance with another feature, an embodiment of the present invention also includes the upper base body having an extension-cord recess spanning radially inward on the top surface of the upper base body from the perimeter edge of the upper base body.

In accordance with yet another feature, an embodiment of the present invention also includes the lower base body having a top surface and a bottom surface opposing the top surface of the lower base body, wherein the bottom surface has a plurality of legs extending therefrom and independently and selectively adjustable in longitudinal length.

In accordance with an additional feature, an embodiment of the present invention also includes the upper base body having an outer lip raised a length above, and disposed around, the top surface of the upper base body, wherein the outer lip defines a perimeter edge surrounding the top surface of the upper base body. Moreover, a portion of the top surface of the upper base body enclosed by the outer lip may also be substantially planar.

Although the invention is illustrated and described herein as embodied in a rotatable base stand with rotatable powering source, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the device, spanning from the lower wall of the lower base body to the top surface of the upper base body. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIG. 2b is an exploded view of a bearing assembly on the rotatable base stand in FIG. 1 in accordance with one embodiment of the present invention;

DETAILED DESCRIPTION

Figure 1:
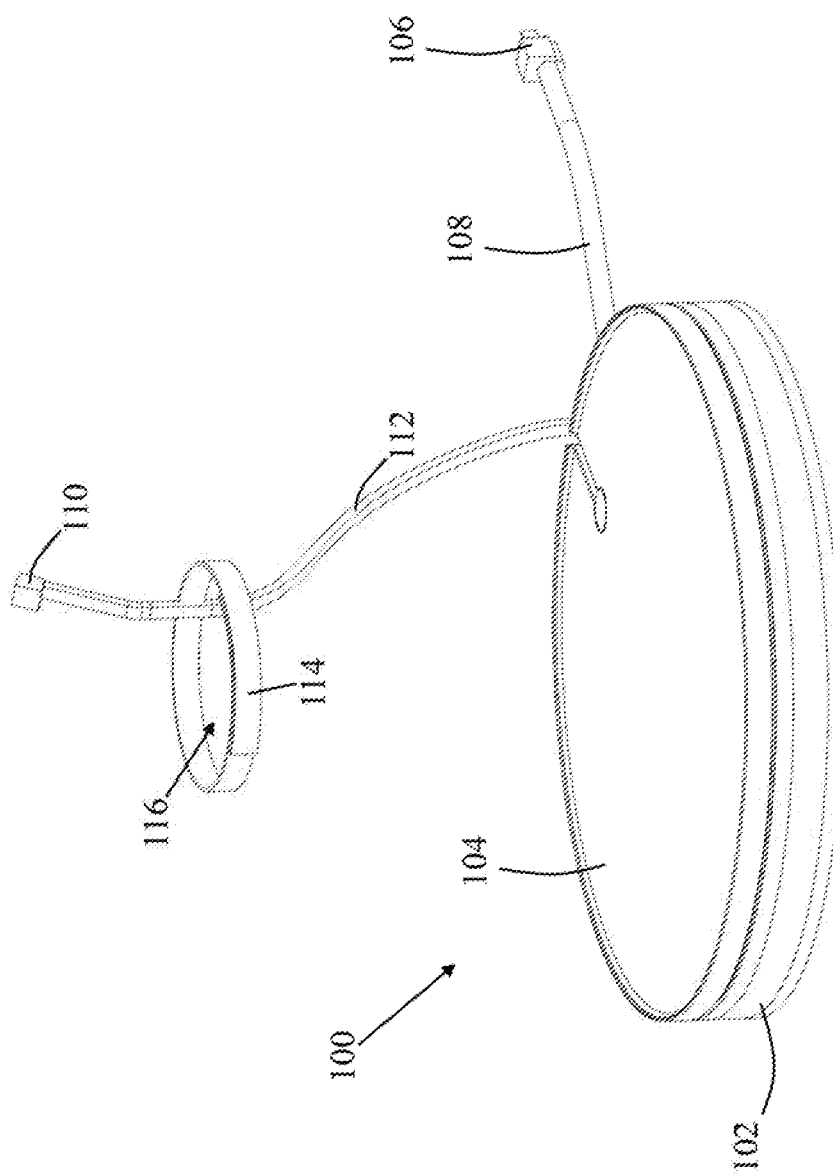
FIG. 1 is a perspective view of a rotatable base stand with rotatable powering source in accordance with one embodiment of the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

Figure 2A:
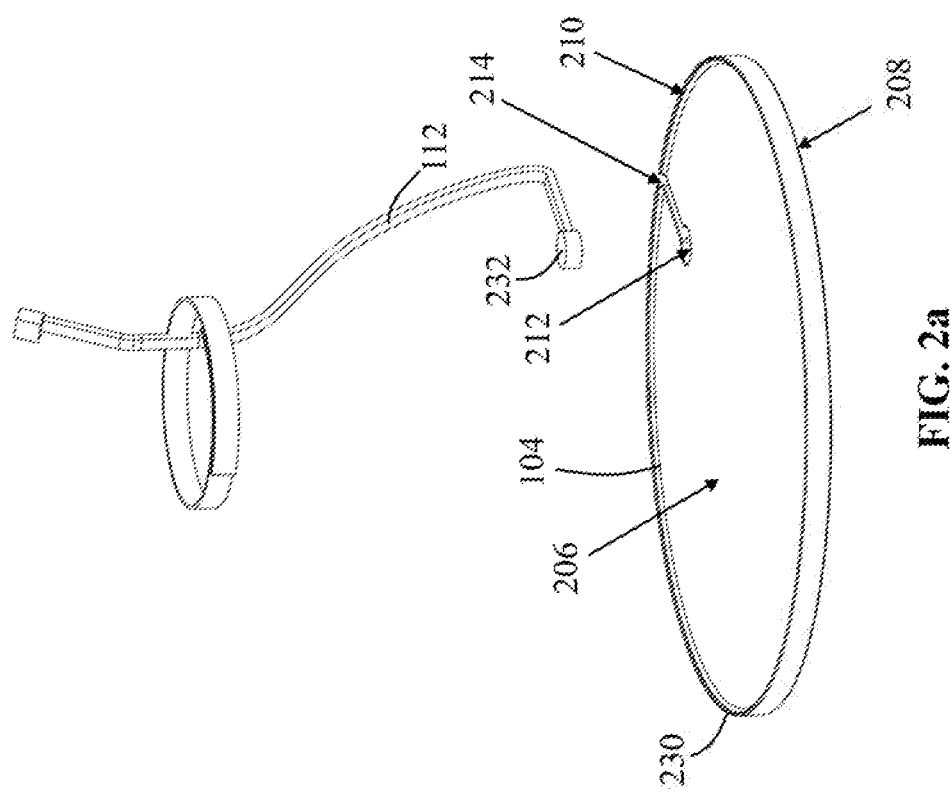
FIG. 2a is an exploded view of an upper base body and electrical extension plug on the rotatable base stand in FIG. 1 in accordance with one embodiment of the present invention.

The present invention provides a novel and efficient rotatable base stand with a rotatable powering source that is operable to rotate 360° and power object(s) supported thereon. Referring now to FIG. 1, one embodiment of the present invention is shown in a perspective view. FIG. 1, along with the other figures herein, shows several advantageous features of the present invention, but, as will be described below, the invention can be provided in several shapes, sizes, combinations of features and components, and varying numbers and functions of the components. The first example of a rotatable base stand with a rotatable powering source, as shown in FIGS. 1-2a-c and the schematic block diagram in FIG. 7, includes main components that include a lower base body 102, an electrical body plug 106, an upper base body 104 that is operable to rotate with respect to the lower base body 102, an electrical extension plug 110, a bearing assembly 218, and a motor 702 operably configured to rotate the upper base body 104. In one embodiment, one or more of the main component(s) may be of a substantially rigid material such as PVC plastic or other polymers that are preferably water resistant. In other embodiments, one or more of the main component(s) may be of a metallic, ceramic, polymer, or combination of the same in order to carry out the purpose and intent of the invention as described herein. For example, the upper base body 104 and lower base body 102 may be configured to support the weight of one or more object(s) weighing over 100 lbs, so their rigidity and ultimate strength should be selected to effectuate the same.

Figure 2C:
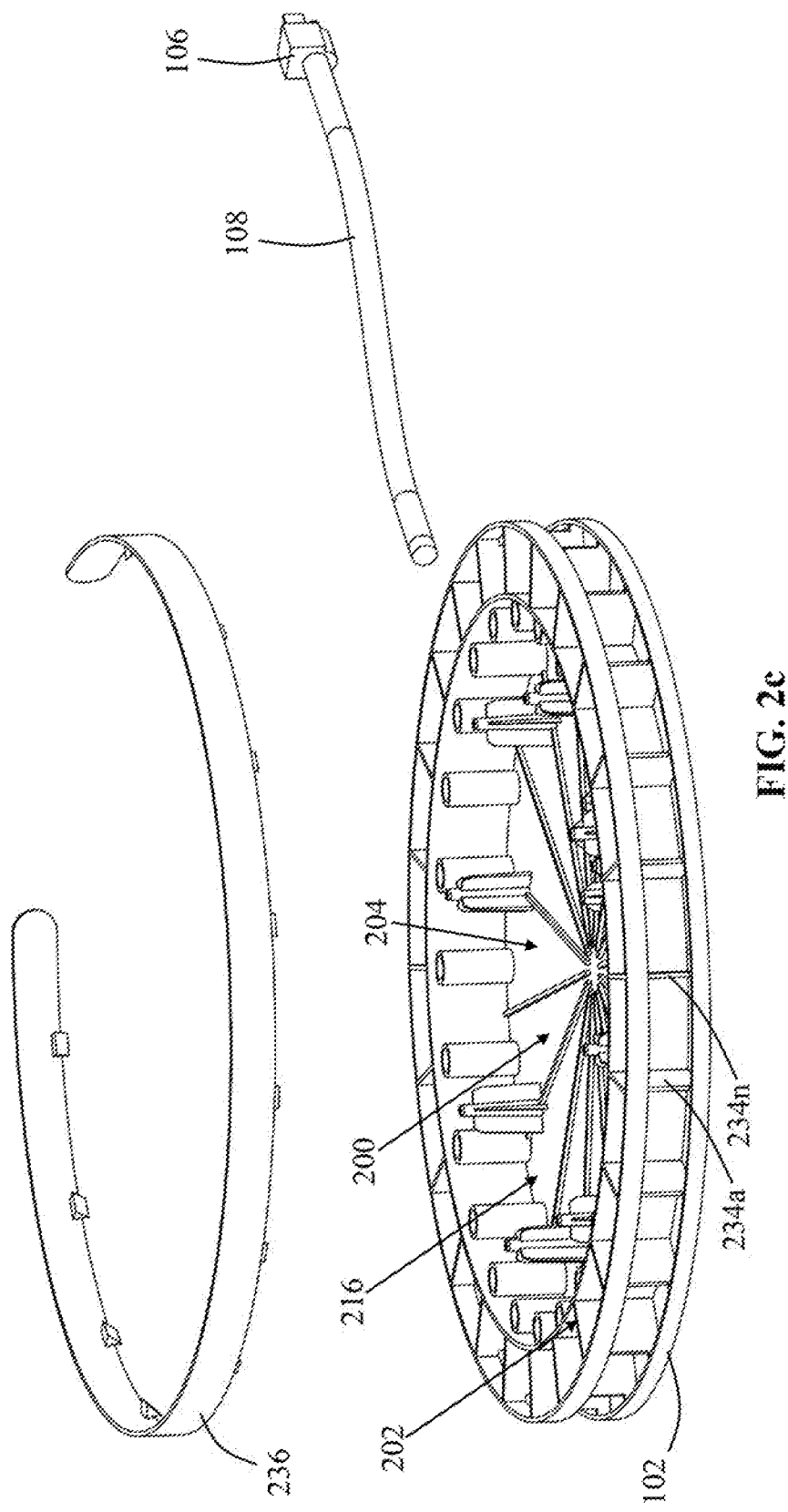
FIG. 2c is an exploded view of an upper base body and electrical extension plug on the rotatable base stand in FIG. 1 in accordance with one embodiment of the present invention.
Figure 3:
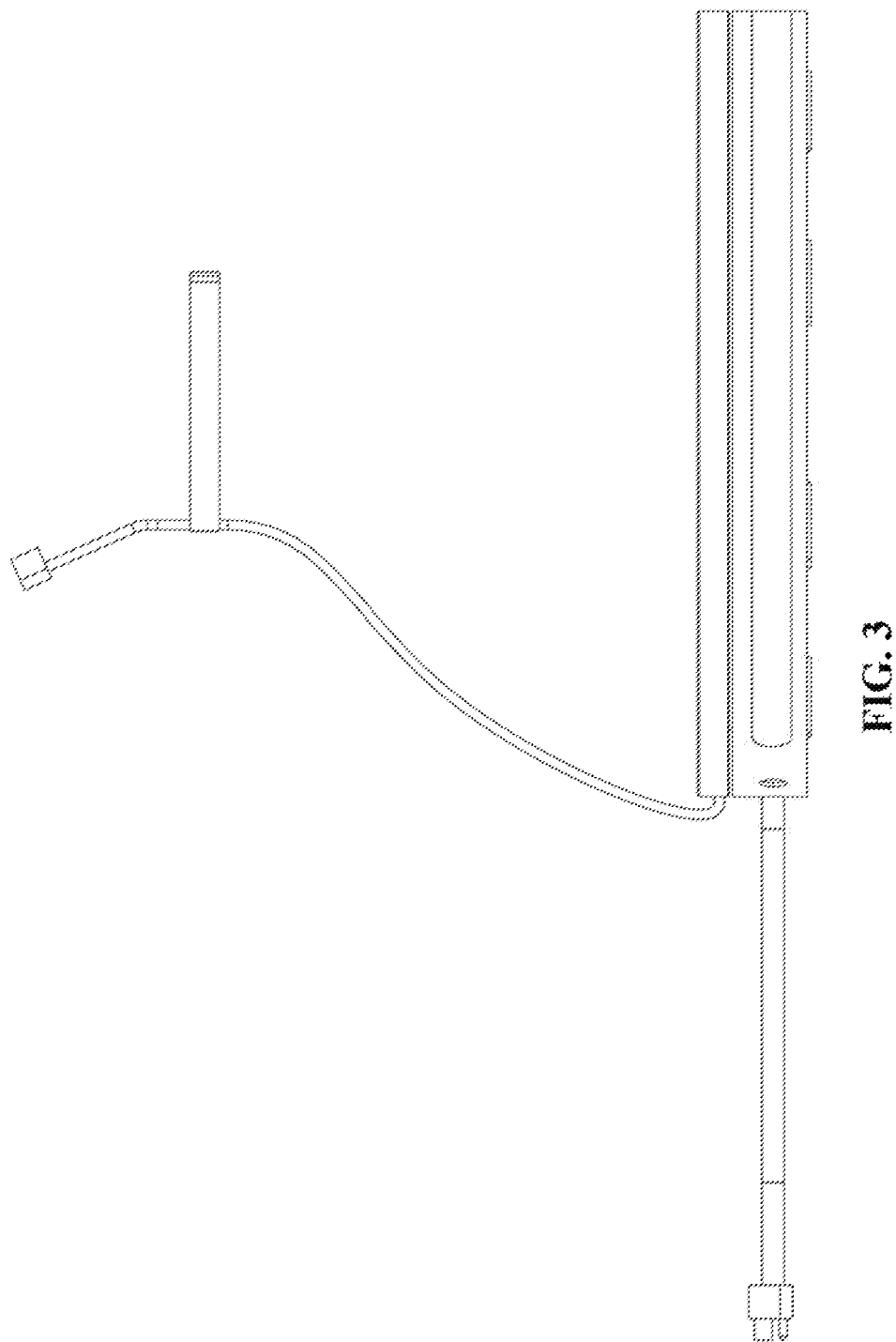
FIG. 3 is a side elevational view of the rotatable base stand with rotatable powering source in FIG. 1.
Figure 4:
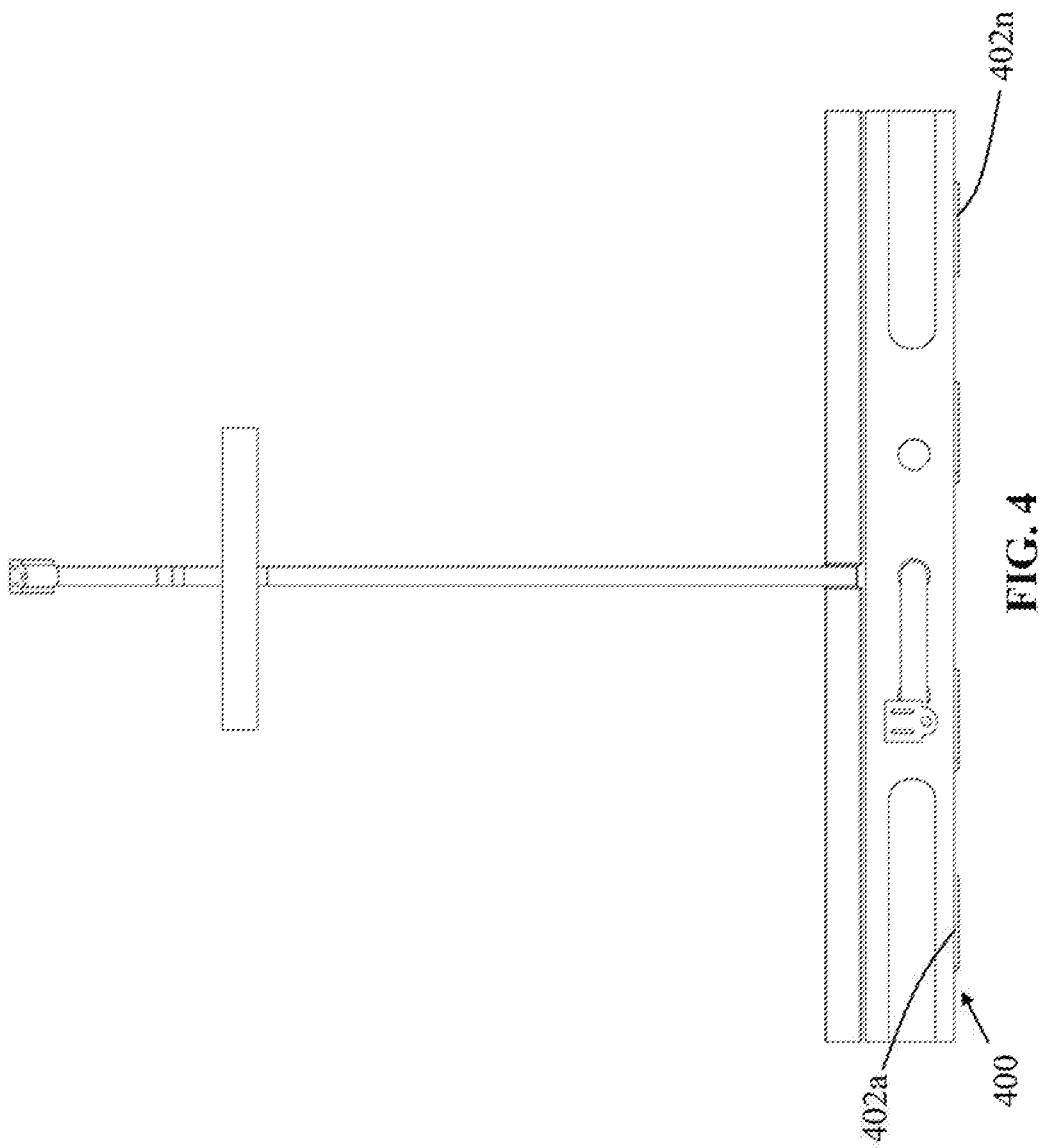
FIG. 4 is a front elevational view of the rotatable base stand with rotatable powering source in FIG. 1.

In one embodiment (as best seen in FIG. 1 and FIG. 2c, the lower base body 102 includes a lower wall 200, a sidewall 202 surrounding the lower wall 200, and defining a body cavity 204 that is configured, shaped, and sized to receive and/or retain electrical, mechanical, and/or electromechanical components therein. As used herein, the term "wall" is intended broadly to encompass continuous structures, as well as separate structures that are coupled together so as to form a substantially continuous external surface. As such, the lower base body 102 can be seen having one or more support wall(s), post(s), and fastener(s) to support, receive, and/or retain electrical, mechanical, and/or electromechanical components or the other main components described above. The lower base body 102 may also include apertures or structures designed to receive and/or retain components such as an electrical fuse 600 for the motor 702 and/or controller 704 (shown in FIGS. 6-7), operational lighting, switch(es) 602, etc. The lower base body 102 may also include a top surface 216 and a bottom surface 400 opposing the top surface of the lower base body 102, wherein the bottom surface 400 may have one or more legs 402a-n extending therefrom. The legs 402a-n may be equally spaced around the bottom surface 400 and may be configured to create a plane for sufficient leveling of the objects being supported. In one embodiment, the legs 402a-n may be independently and selectively adjustable in longitudinal length to generate a level support surface.

In one embodiment, the assembly 100 may also include an electrical body plug 106 electrically coupled to a body electrical cord 108 extending outwardly from the sidewall 202 of the lower base body 102. The electrical body plug 106 (or electrical outlets) utilized and described herein may be of a USA standard three-prong configuration, referred to as a Type B electrical outlet plug according to the U.S. Department of Commerce International Trade Administration (USDCITA), which is a standard power outlet plug in the United States of America, as is known generally in the art. In other embodiments, the plug recesses may be operable to receive and/or prongs may be formed as a two-prong plug referred to as a Type B electrical outlet plug by the USDCITA, or other plugs configurations that may be standard in various different countries (e.g., Type C used commonly in Europe, Type D used commonly in India, Type E used commonly in France and other European countries, Type F used commonly in Russia, Types G through Type 0, and the like. In another embodiment, a standard USB prong may be utilized or is otherwise operable to transfer electricity through the plug and cord coupled thereto. In some embodiments, the assembly 100 may include a local power, e.g., batteries, housed internally in the assembly 100 for powering the electrical components therein. Said differently, the electricity from a power source 700 is operable to provide current through circuitry in the plug(s), outlets, and electrical devices on the assembly 100. In one additional embodiment, the assembly 100 will include a driver, or AC-to-DC converter, in order to convert AC power to DC power, e.g., to power the motor 702. In an alternative embodiment, the modular unit assembly may not include an AC-to-DC converter.

As best seen in FIGS. 1-2a, the upper base body 104 includes a top surface 206, a bottom surface 208 opposing the top surface 206, and can be seen defining an extension outlet port 212 on the top surface 206 of the upper base body 104. An extension electrical outlet 708 may be also coupled to the upper base body 104, wherein the extension electrical outlet 708 can be beneficially seen having outlet ports oriented in a longitudinal direction to effectuate convenient, effective, and safe transmission of electricity to a plug/cable that may electrically and/or mechanically couple to an object supported by the top surface 206 of the upper base body 104. The extension electrical outlet 708 is disposed within the extension outlet port 212 and may be operably configured to electrically couple with the electrical body plug 106. Said another way, the extension electrical outlet 708 may be wired in a way to enable completion of the circuit therein when the electrical body plug 106 or other power source 700 is powered or the completion of the circuit therein may be selectively controlled with an electronic controller 704 and/ or switch 602.

Advantageously, an electrical extension plug 110, electrically coupled to an extension electrical cord 112, may be utilized to effectively transmit from the extension electrical outlet 708. The electrical extension plug 110 and cord 112 can be seen extending outwardly from the extension electrical outlet 708. In one embodiment, the electrical extension plug 110 and cord 112 may be permanently or semi-permanently coupled to the extension electrical outlet 708, while in other embodiments the electrical extension plug 110 and cord 112 may be selectively coupled and removed from the extension electrical outlet 708 for adjustability of different cord lengths to accommodate the height of different object (s) supported by the assembly 100.

In an additional embodiment of the present invention, the upper base body 104 houses a spring-loaded reel system operably configured to wind and retain the extension electrical cord 112 and selectively extend the extension electrical cord 112 a desired length by the user. In another embodiment of the present invention, a spring-loaded reel system may be utilized and operably configured to wind and retain the body electrical cord 108 and selectively extend the body electrical cord 108 a desired length by the user. Additionally, the electrical extension plug 110 or the extension electrical cord 112 may have a coupling strap 114 with a portion coupled and affixed thereto, e.g., using adhesive or a fastener. The coupling strap 114 may be operably configured selectively close forming an enclosed loop (as best seen in FIGS. 1-2a) and an adjustable loop aperture 116 to accommodate diameters of different sizes. The coupling strap 114 may also selectively open to provide access to the adjustable loop aperture 116 with two ends of the coupling strap 114, e.g., using a hook-and-loop material or other fasteners. As such, the coupling strap 114 may be configured to retain the extension electrical cord 112 to the object(s) desired to electrically power while rotating on the base assembly 100, thereby providing safe and effective placement of a powering source proximal to the object(s) supported on the assembly 100.

In one embodiment, the upper base body 104 may also include a perimeter edge 210 surrounding the top surface 206 of the upper base body 104, wherein the outlet port 212 disposed proximal (i.e., at or within approximately 2-3 inches) to the perimeter edge 210. In one embodiment, the outlet port 212 is preferably recessed below the top surface 206 to prevent inadvertent removal of a plug or cord extending from the extension electrical outlet 708 disposed within the outlet port 212. Additionally, the upper base body 104 also includes an extension-cord recess 214 spanning radially inward on the top surface 206 of the upper base body 104 from the perimeter edge 210 of the upper base body 104. In further embodiments, the outlet port 212 is shaped and sized to contour and receive a plug 232 disposed on an end of the extension electrical cord 112. The outlet port 212 and the extension-cord recess 214 may also be sized, shaped, and configured to contour, receive, and/or retain the plug 232 and the extension electrical cord 112 such that the upper surfaces thereon are flush with the top surface 206 of the upper base body 104. In one embodiment, the plug 232 and a portion of the extension electrical cord 112 may be pre-formed into a shape to enable effective and safe placement of the plug 232 and the extension electrical cord 112 the upper base body 104 (as best seen in FIG. 2a).

In additional embodiments of the present invention, the upper base body 104 includes an outer lip 230 raised a length above (e.g., approximately 2 inches), and disposed around, the top surface 206 of the upper base body 104. The outer lip 230 may also define the perimeter edge 210 surrounding the top surface 206 of the upper base body 104. As such, the outer lip 230 prevents object(s) from inadvertently being removed from the top surface 206 of the upper base body 104 and from object-debris from falling onto a ground surface in which the assembly 100 is supported. To further support object(s) supported by the assembly 100, a portion of the top surface 206 of the upper base body 104 that is enclosed by the outer lip 230 is substantially planar, i.e., flat and/or having limited raised surfaces that would otherwise cause an object to tilt. In additional embodiments of the present invention, no outer lip 230 may be utilized and a channel spanning around and proximal to the perimeter edge 210 may be utilized to resist object(s)/debris from existing the platform/top surface 206 of the upper base body 104 and permit object(s) from extending outwardly from the perimeter edge 210 of the upper base body 104.

To effectuate rotation of the upper base body 104 with respect to the lower base body 102, the bearing assembly 218 is rotatably coupled to the upper base body 104 and the lower base body 102. The bearing assembly 218 is interposed between the lower base body 102 and the upper base body 104 and may include a plurality of gears 220, 222 directly coupled together in a meshed configuration (as best seen in FIG. 2b). One of the plurality of gears 220, 222 may be directly coupled to the motor 702 and another of the plurality of gears 220, 222 may be coupled to the upper base body 104. The plurality of gears 220, 222 may also include a pinion gear 222 directly coupled to the motor 702 and an annular gear 220 having a sidewall with an inner surface having a plurality of teeth disposed thereon, wherein the pinion gear 222 is operable to directly coupled thereto and cause rotation of the annular gear 220. Specifically, the annular gear 220 may include an upper surface 224 with the bottom surface 208 of the upper base body 104 directly coupled thereto. In one embodiment, the annular gear 220 is affixed to the upper base body 104 using one or more fastener(s), welding, adhesive, etc. To that end, the bearing assembly 218 may include a lower track 228 directly coupled to the lower base body 102 and an annular gasket 226 interposed between and directly coupled to the lower track 228 and the annular gear 220, wherein the annular gasket 216 enables rotation of the upper base body 104 with respect to the lower base body 102 with minimal frictional resistance.

Figure 5:
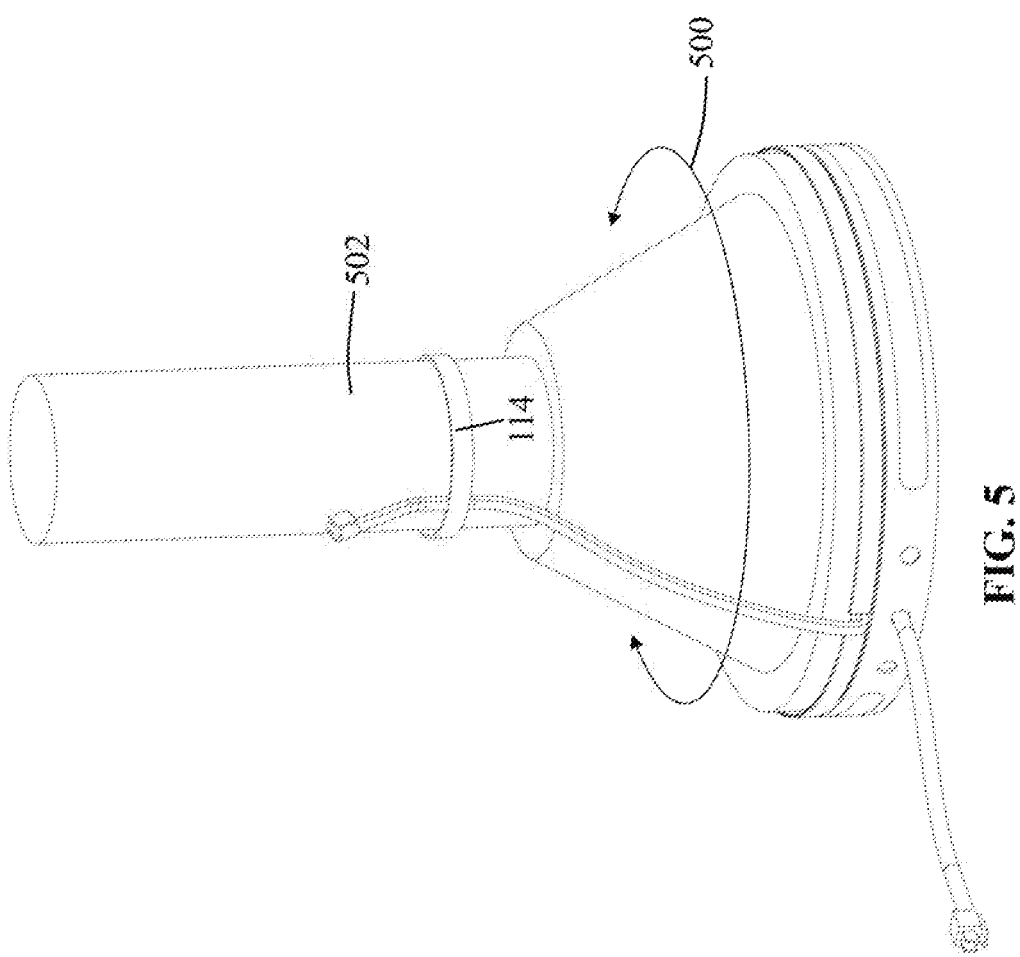
FIG. 5 is a perspective view of the rotatable base stand with rotatable powering source in FIG. 1 with an object supported thereon in a first stand rotation position along a base rotation path in accordance with one embodiment of the present invention.
Figure 6:
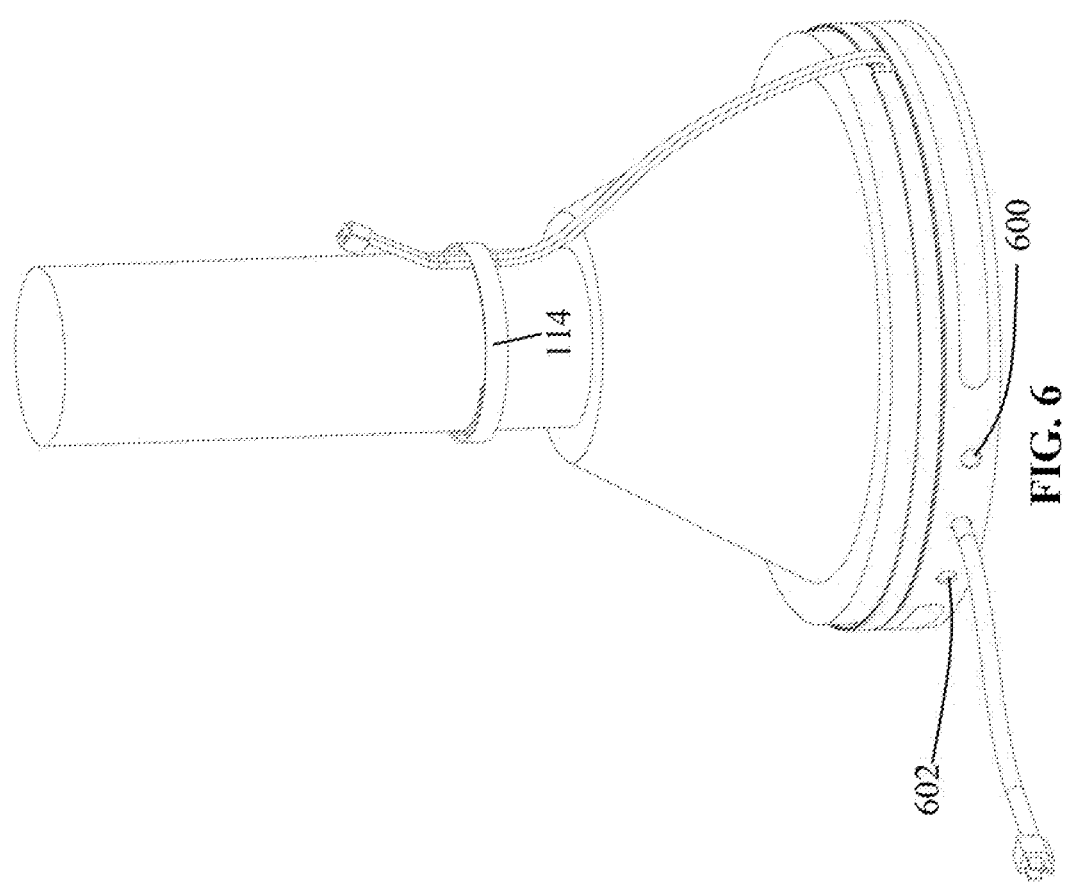
FIG. 6 is a perspective view of the rotatable base stand with rotatable powering source in FIG. 5 with the object in a second stand rotation position in accordance with one embodiment of the present invention.

Referring to FIGS. 1-2a and FIGS. 5-7, the motor 702 may be housed in the body cavity 204, may be electrically coupled to the electrical body plug 106, and is operably coupled to the upper base body 104, e.g., through the pinion gear 222. The motor 702 may of a stepper motor, e.g., a brushless DC electric motor that divides a full rotation into a number of equal steps. The motor's position can then be commanded, e.g., with the ECU 704, to move and hold at one of these steps without any position sensor for feedback (an open-loop controller). Other motors, however, may be utilized to effectuate rotation of the upper base body 104 and/or based on the desired weight of the object(s) to be carried by the upper base body 104. The motor 702 is also operably configured to selectively rotate the upper base body 104, with the extension electrical outlet 708, at least 180° along a base rotation path (represented with arrow 500 in with respect to the lower base body 102. In preferred embodiments, the base rotation path 500 is a 360° circular rotation path in either or both the clockwise or counterclockwise directions. The base rotation path 500 depicted in FIG. 5 is exemplary, and the rotational positions of the upper base body 104 (as depicted in FIGS. 5-6, respectively) are also exemplary, but can be seen providing effective rotation of the object 502 (e.g., a Christmas tree) in a safe and effective manner not accomplished with the known art.

To effectuate transmission of power from a power source 700 to the extension outlet 708, the upper base body 104 utilizes a rotary electrical slip ring 714 directly coupled to, and centrally disposed on, the upper base body 104. The rotary electrical slip ring 714 may be electrically coupled with the extension electrical outlet 708 and the electrical body plug 106. The rotary electrical slip ring 714 is an electromechanical device that allows the transmission of power and electrical signals from a stationary (e.g., the lower base body 102) to a rotating structure (e.g., the upper base body 104 and outlet 708). The slip ring 714 improves mechanical performance, simplifies system operation, and eliminate damage-prone wires dangling from movable joints. In other embodiments of the present invention, power may be transmitted using electrical connections between two or more electrically conductive components located on the bearing assembly 218. For example, the gasket 226 and/or portion of the track 228 may be electrically conductive and provided power from the power source 700, wherein the annular gear 220 or extension outlet 708 may be operable (when caused by the weight of top surface 206 when the object(s) are placed thereon) to electrically connect or couple with the gasket 226 and/or portion of the track 228 to transmit power therethrough. Various power connections can be seen in FIG. 7 with connections 710a-n (wherein "n" represents any number greater than two).

Figure 7:
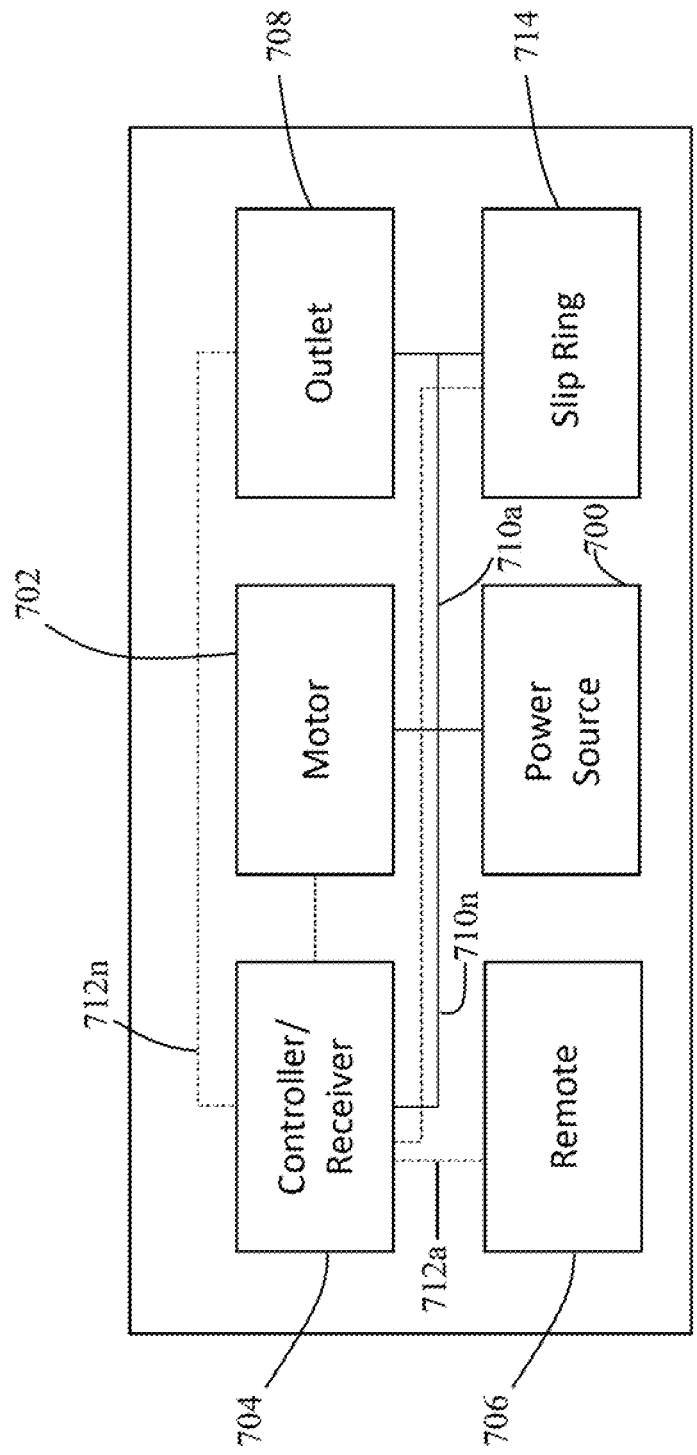
FIG. 7 is a block diagram depicting the electrical and other components of a rotatable base stand with rotatable powering source in accordance with one embodiment of the present invention.

With reference to FIG. 1 and FIG. 7, in one embodiment, an electronic control unit (ECU) 704 is housed in the body cavity 204 and is electrically coupled to the electrical extension plug 110 and communicatively coupled to at least one of the electrical extension plug 110 and motor 702 and operably configured to emit an electronic signal to operate the motor 702 and/or emit an electronic signal completing an electrical circuit on the electrical extension plug 110. In further embodiments, a remote control 706 may be communicatively coupled to the electronic control unit 704 and operably configured to cause the electronic control unit 704 to emit the at least one of the electronic signal to operate the motor 702 and the completion of the electrical circuit on the electrical extension plug 110.

Additionally, the assembly may utilize a network interface and/or another communication protocol and/or components to enable connectivity of the controller 704 or another component to a software application resident on an outside mobile computing device (e.g., Alexa®, a cellphone, etc.). Specifically, the assembly 100 may be operated over a network or communication network that include wired or wireless connections 712a-n (wherein "n" represents any number greater than two). The connections 712a-are the medium used to provide communications links between various devices and computers connected together within or outside of the assembly 100. A few exemplary wired connections are cable, phone line, and fiber optic. Exemplary wireless connections include radio frequency (RF) and infrared radiation (IR) transmission. Many other wired and wireless connections are known in the art and can be used with the present invention. The assembly may be implemented over a number of different types of networks, such as for example, an Intranet, a local area network (LAN), or a wide area network (WAN).

With reference to FIGS. 2c-4, the device 100 may include a plurality of light-emitting diodes (LEDs) 234a-n or other light(s) spaced around the lower base body 102 that may be independently powered and/or electrically coupled to the power source 700. The (LEDs) 234a-n are operably configured to emit a light radially from the lower base body 102 (or the upper base body 104—if coupled thereto) and through a translucent or transparent cover or shield 236. The LEDs 234a-n may also be selectively controlled by the remote control 706, i.e., the LEDs 234a-n may turn on and off, in addition to enabling the color changing (constantly and/or alternating) of the LEDs 234a-n.

It should be understood that terms such as, "front," "rear," "side," top," "bottom," and the like are indicated from the reference point of a viewer viewing the assembly 100 as referenced in the drawings. While FIG. X will be described in conjunction with the process flow chart of FIG. Y. Although a specific order of executing steps have been described herein, the order of executing the steps may be changed relative to the order shown in certain embodiments. Also, two or more steps shown in succession may be executed concurrently or with partial concurrence in some embodiments. Certain steps may also be omitted for the sake of brevity. In some embodiments, some or all of the process steps can be combined into a single process.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above described features.

What is claimed is:

1. A rotatable base stand with rotatable powering source comprising:

a lower base body having a lower wall, a sidewall surrounding the lower wall, and defining a body cavity;

an electrical body plug electrically coupled to a body electrical cord extending outwardly from the sidewall of the lower base body;

an upper base body with a top surface, a perimeter edge surrounding the top surface of the upper base body, defining an extension-cord recess spanning radially inward on the top surface of the upper base body from the perimeter edge of the upper base body, with a bottom surface opposing the top surface, defining an extension outlet port on the top surface of the upper base body, and with an extension electrical outlet coupled thereto, having outlet ports oriented in a longitudinal direction, disposed within the extension outlet port, and operably configured to electrically couple with the electrical body plug;

an electrical extension plug electrically coupled to an extension electrical cord extending outwardly from and electrically coupled to the extension electrical outlet;

a bearing assembly rotatably coupling the upper base body to the lower base body, the bearing assembly interposed between the lower base body and the upper base body; and a motor housed in the body cavity, electrically coupled to the electrical body plug, and operably coupled to the upper base body, the motor operably configured to selectively rotate the upper base body, with the extension electrical outlet, at least 180° along a base rotation path with respect to the lower base body.

2. The rotatable base stand with rotatable powering source according to claim 1, wherein the bearing assembly further comprising:

a plurality of gears directly coupled together in a meshed configuration, one of the plurality of gears directly coupled to the motor and another of the plurality of gears coupled to the upper base body.

3. The rotatable base stand with rotatable powering source according to claim 2, wherein the plurality of gears further comprise:

a pinion gear directly coupled to the motor and an annular gear having a sidewall with an inner surface having a plurality of teeth disposed thereon and with pinion gear directly coupled thereto, the annular gear with an upper surface including the bottom surface of the upper base body directly coupled thereto.

4. The rotatable base stand with rotatable powering source according to claim 3, wherein the bearing assembly further comprises:

a lower track directly coupled to the lower base body; and an annular gasket interposed between and directly coupled to the lower track and the annular gear.

5. The rotatable base stand with rotatable powering source according to claim 3, wherein the upper base body further comprises:

a rotary electrical slip ring directly coupled to, and centrally disposed on, the upper base body, the rotary electrical slip ring electrically coupled with the extension electrical outlet and the electrical body plug.

6. The rotatable base stand with rotatable powering source according to claim 1, further comprising:

an electronic control unit housed in the body cavity and electrically coupled to the electrical extension plug and communicatively coupled to at least one of the electrical extension plug and motor and operably configured to at least one of emit an electronic signal to operate the motor and emit an electronic signal completing an electrical circuit on the electrical extension plug.

7. The rotatable base stand with rotatable powering source according to claim 6, further comprising:
a remote control communicatively coupled to the electronic control unit and operably configured to cause the electronic control unit to emit the at least one of the electronic signal to operate the motor and the completion of the electrical circuit on the electrical extension plug.

8. The rotatable base stand with rotatable powering source according to claim 1, wherein either the electrical extension plug or the extension electrical cord further comprise:
a coupling strap with a portion coupled and affixed to thereto, the coupling strap operably configured selectively close forming an enclosed loop and an adjustable loop aperture and selectively open to provide access to the adjustable loop aperture with two ends of the coupling strap.

9. The rotatable base stand with rotatable powering source according to claim 8, wherein the upper base body further comprises:
the extension outlet port disposed proximal to the perimeter edge.

10. The rotatable base stand with rotatable powering source according to claim 1, wherein the lower base body further comprises:
a top surface and a bottom surface opposing the top surface of the lower base body, the bottom surface having a plurality of legs extending therefrom and independently and selectively adjustable in longitudinal length.

11. The rotatable base stand with rotatable powering source according to claim 1, wherein the upper base body further comprises:
an outer lip raised a length above, and disposed around, the top surface of the upper base body, the outer lip defining the perimeter edge surrounding the top surface of the upper base body.

12. The rotatable base stand with rotatable powering source according to claim 11, wherein:
a portion of the top surface of the upper base body enclosed by the outer lip is substantially planar.

13. The rotatable base stand with rotatable powering source according to claim 1, wherein the upper base body further comprises:
a rotary electrical slip ring directly coupled to, and centrally disposed on, the upper base body, the rotary electrical slip ring electrically coupled with the extension electrical outlet and the electrical body plug.

14. A rotatable base stand with rotatable powering source comprising:
a lower base body having a lower wall, a sidewall surrounding the lower wall, and defining a body cavity;
an electrical body plug electrically coupled to a body electrical cord;
an upper base body with a top surface, with a bottom surface opposing the top surface, defining an extension outlet port on the top surface of the upper base body, an upper base body with a top surface, with a perimeter edge surrounding the top surface of the upper base body, defining an extension-cord recess spanning radially inward on the top surface of the upper base body from the perimeter edge of the upper base body, and with an extension electrical outlet coupled thereto, having outlet ports, disposed within the extension outlet port, with the outlet ports oriented in a longitudinal direction, and operably configured to electrically couple with the electrical body plug, the upper base body having a rotary electrical slip ring directly coupled to, and centrally disposed on, the upper base body, the rotary electrical slip ring electrically coupled with the extension electrical outlet and the electrical body plug;
a bearing assembly rotatably coupling the upper base body to the lower base body, the bearing assembly and interposed between the lower base body and the upper base body; and
a motor housed in the body cavity, electrically coupled to the electrical body plug, and operably coupled to the upper base body, the motor operably configured to selectively rotate the upper base body, with the extension electrical outlet, 360° along a base rotation path with respect to the lower base body.

15. The rotatable base stand with rotatable powering source according to claim 14, further comprising:
an electrical extension plug electrically coupled to an extension electrical cord extending outwardly from and electrically coupled to the extension electrical outlet.

16. The rotatable base stand with rotatable powering source according to claim 15, wherein either the electrical extension plug or the extension electrical cord further comprise:
a coupling strap with a portion coupled and affixed to thereto, the coupling strap operably configured selectively close forming an enclosed loop and an adjustable loop aperture and selectively open to provide access to the adjustable loop aperture with two ends of the coupling strap.

17. The rotatable base stand with rotatable powering source according to claim 14, wherein the bearing assembly further comprising:
a plurality of gears directly coupled together in a meshed configuration, one of the plurality of gears directly coupled to the motor and another of the plurality of gears coupled to the upper base body.

18. The rotatable base stand with rotatable powering source according to claim 14, wherein the plurality of gears further comprise:
a pinion gear directly coupled to the motor and an annular gear having a sidewall with an inner surface having a plurality of teeth disposed thereon and with pinion gear directly coupled thereto, the annular gear with an upper surface including the bottom surface of the upper base body directly coupled thereto.

19. A rotatable base stand with rotatable powering source comprising:
a lower base body having a lower wall, a sidewall surrounding the lower wall, and defining a body cavity;
an upper base body with a top surface, a perimeter edge surrounding the top surface of the upper base body, defining an extension-cord recess spanning radially inward on the top surface of the upper base body from the perimeter edge of the upper base body, with a bottom surface opposing the top surface, defining an extension outlet port on the top surface of the upper base body, and with an extension electrical outlet coupled thereto, having outlet ports oriented in a longitudinal direction and disposed within the extension outlet port;
an electrical extension plug electrically coupled to an extension electrical cord extending outwardly from and electrically coupled to the extension electrical outlet;

a bearing assembly rotatably coupling the upper base body to the lower base body, the bearing assembly interposed between the lower base body and the upper base body; and
a motor housed in the body cavity and operably coupled to the upper base body, the motor operably configured to selectively rotate the upper base body, with the extension electrical outlet, at least 180° along a base rotation path with respect to the lower base body.

* * * * *